United States Patent
Harada

(10) Patent No.: US 10,391,642 B2
(45) Date of Patent: Aug. 27, 2019

(54) BALANCER DEVICE

(71) Applicant: KAWASAKI JUKOGYO KABUSHIKI KAISHA, Kobe-shi, Hyogo (JP)

(72) Inventor: Takashi Harada, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 309 days.

(21) Appl. No.: 15/108,346

(22) PCT Filed: Dec. 22, 2014

(86) PCT No.: PCT/JP2014/006403
§ 371 (c)(1),
(2) Date: Jun. 27, 2016

(87) PCT Pub. No.: WO2015/098094
PCT Pub. Date: Jul. 2, 2015

(65) Prior Publication Data
US 2016/0325441 A1    Nov. 10, 2016

(30) Foreign Application Priority Data

Dec. 25, 2013   (JP) .................................. 2013-267385

(51) Int. Cl.
*B25J 19/00*   (2006.01)

(52) U.S. Cl.
CPC .................................. *B25J 19/0012* (2013.01)

(58) Field of Classification Search
CPC ...................................................... B25J 19/0012
See application file for complete search history.

(56) References Cited

U.S. PATENT DOCUMENTS

| | | | | |
|---|---|---|---|---|
| 4,045,008 | A * | 8/1977 | Bauer | F16F 9/36 267/120 |
| 6,408,225 | B1 * | 6/2002 | Ortmeier | B25J 19/0012 192/58.62 |
| 2010/0212305 | A1 * | 8/2010 | Runesson | B25J 19/0012 60/327 |

FOREIGN PATENT DOCUMENTS

| JP | H01-295787 A | 11/1989 |
|---|---|---|
| JP | H10-44084 A | 2/1998 |
| JP | 2005-319550 A | 11/2005 |

(Continued)

OTHER PUBLICATIONS

Feb. 3, 2015 International Search Report issued in International Patent Application No. PCT/JP2014/006403.

(Continued)

*Primary Examiner* — William Kelleher
*Assistant Examiner* — Gregory T Prather
(74) *Attorney, Agent, or Firm* — Oliff PLC

(57) ABSTRACT

A balancer is provided on robot including a first arm and an arm support for the base end of the first arm to rotate freely via bearing members that have a first axis line extending in the horizontal direction as a central axis; and a gas spring mechanism for causing the first arm to generate torque centered on the first axis line by elastic expansion or elastic contraction in a direction opposite the torque centered on the first axis line that is generated by gravity acting on the first arm between a first angular position and a second angular position in which the slope with respect to the vertical direction is greater than the first angular position.

5 Claims, 9 Drawing Sheets

(56) References Cited

FOREIGN PATENT DOCUMENTS

JP   2012-148392 A   8/2012

OTHER PUBLICATIONS

Jun. 28, 2016 International Preliminary Report on Patentability issued in International Patent Application No. PCT/JP2014/006403.

* cited by examiner

BALANCER DEVICE

TECHNICAL FIELD

The present invention relates to a balancer device for use in a robot.

BACKGROUND ART

Conventionally, there is known a balancer device which cancels a variation in gravitational torque generated by the rotation of a robot arm (see e.g., Patent Literature 1).

This balancer device couples a first arm to a base body. A rod end of a balancer is coupled to a fixed shaft protruding laterally of the first arm. The other end of the balancer which is closer to a cylinder is coupled to a fixed shaft provided at the lower portion of the base body. With this configuration, the rotation of the first arm is assisted.

CITATION LIST

Patent Literature

Patent Literature 1: Japanese Laid-Open Patent Application Publication No. 2005-319550

SUMMARY OF INVENTION

Technical Problem

However, in the balancer device disclosed in Patent Literature 1, the first arm and the rod end of the balancer are connected to each other at a location that is outward relative to a bearing member provided between the first arm and the base body, in the axial direction of the bearing member. In this configuration, a great bending moment is applied to a bearing. For this reason, it is necessary to use the bearing member with a great permissible bending moment. As a result, the weight of a robot arm increases, and it becomes necessary to use a motor which is capable of generating a high output. This brings about an increase in electric power consumption.

Solution to Problem

To achieve the above-described object, according to an aspect of the present invention, there is provided a balancer device which is provided at a robot including a robot arm, and an arm support section to which a base end portion of the robot arm is mounted via a bearing member having a first axis extending horizontally as a center axis in such a manner that the robot arm is rotatable, the balancer device including an elastic structure unit which is elastically extended or elastically contracted to cause the robot arm to generate torque (hereinafter this torque will be referred to as balance torque) around the first axis in a direction opposite to torque around the first axis which is generated by a gravitational force applied to the robot arm, between a first angular position and a second angular position which is greater in inclination with respect to a vertical direction than the first angular position is, wherein a first end portion of the balancer device is coupled to a first fastening section which is independent of the robot arm in such a manner that the balancer device is rotatable around a second axis extending horizontally, wherein a second end portion of the balancer device is coupled to a second fastening section provided at the robot arm in such a manner that the balancer device is rotatable around a third axis extending horizontally, and wherein the balancer device is placed in such a manner that the first end portion and the second end portion are located in a region in which the bearing member is located in a direction in which the first axis extends.

In accordance with this configuration, a bending moment acting on the bearing member can be reduced, and hence the bearing member with a small permissible bending moment can be used. Therefore, the weight of the robot can be reduced, and the output of the drive section of the robot can be reduced. As a result, the electric power consumption in the robot can be reduced.

The elastic structure unit may be a gas spring mechanism.

In accordance with this configuration, the gas spring mechanism with a small size is able to generate a great spring force.

A spacing formed between the second axis and the third axis in a state in which the robot arm is at the second angular position may be greater than a spacing formed between the second axis and the third axis in a state in which the robot arm is at the first angular position.

In accordance with this configuration, the balance torque can be generated by extending the balancer device.

The gas spring mechanism may be extended to expand a working fluid, and the balance torque may be generated by a reactive force generated by expansion of the working fluid.

In accordance with this configuration, the balance torque can be generated by using the gas spring mechanism which is configured to be extendable.

The gas spring mechanism may be extended to compress a working fluid, and the balance torque may be generated by a reactive force generated by compression of the working fluid.

In accordance with this configuration, great balance torque can be generated by using the gas spring mechanism which is configured to be contractible.

The gas spring mechanism may be contracted to compress a working fluid, the balancer device may comprise a conversion mechanism which contracts the gas spring mechanism, according to a rotation of the robot arm from the first angular position toward the second angular position, and the balance torque may be generated by a reactive force generated by compression of the working fluid.

In accordance with this configuration, great balance torque can be generated using the gas spring mechanism which is configured to be contractible. In addition, the durability of the gas spring mechanism can be improved.

The gas spring mechanism may include: a cylinder extending in a direction from a first end portion of the elastic structure unit toward a second end portion of the elastic structure unit, the cylinder having a first end portion formed with an opening and a second end portion closed; a piston which is relatively slidable with respect to an inner wall surface of the cylinder; a working fluid provided in a space formed between the cylinder and the piston; and a piston rod having a first end portion coupled to the piston, the piston rod extending from a spatial position at which the piston rod is coupled to the piston to a location that is outside the cylinder through the opening of the cylinder, the conversion mechanism may include: a first coupling member which couples the cylinder to one of the first fastening section and the second fastening section which is located in a direction from the second end portion of the cylinder toward the first end portion of the cylinder; and a second coupling member which couples a second end portion of the piston rod to the other of the first fastening section and the second fastening section, while preventing interference with the cylinder and the first coupling member.

In accordance with this configuration, the gas spring mechanism which is configured to be contractible can be suitably mounted to the robot arm.

The gas spring mechanism may further include seal oil provided in a space formed between the cylinder and the piston, and the gas spring mechanism may be placed in such a manner that the first fastening section is located in the direction from the second end portion of the cylinder toward the first end portion of the cylinder.

In accordance with this configuration, he durability of the gas spring mechanism can be further improved.

Third axis may extend through the cylinder.

In accordance with this configuration, the operation range of the robot arm can be increased.

Advantageous Effects of Invention

The present invention can obtain an advantage that electric power consumption in a robot can be reduced.

DESCRIPTION OF EMBODIMENTS

Hereinafter, the embodiments of the present invention will be described with reference to the drawings. The present invention is not limited by the embodiments. Throughout the drawings, the same or corresponding components are designated by the same reference symbols, and will not be described repeatedly.

Embodiment 1

Figure 1:
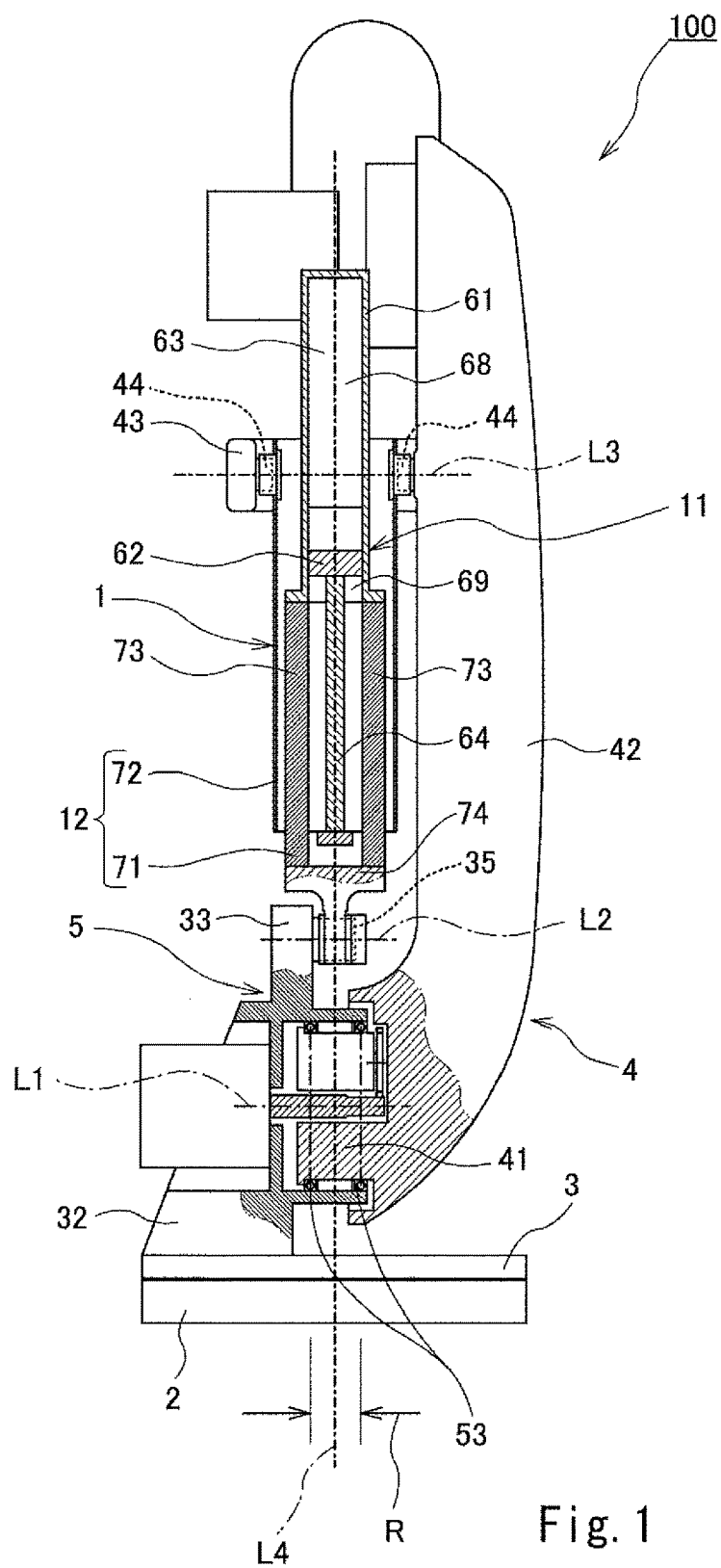
FIG. 1 is a rear view showing the exemplary configuration of a robot including a balancer device according to Embodiment 1 of the present invention, which is partly cut away.
Figure 2:
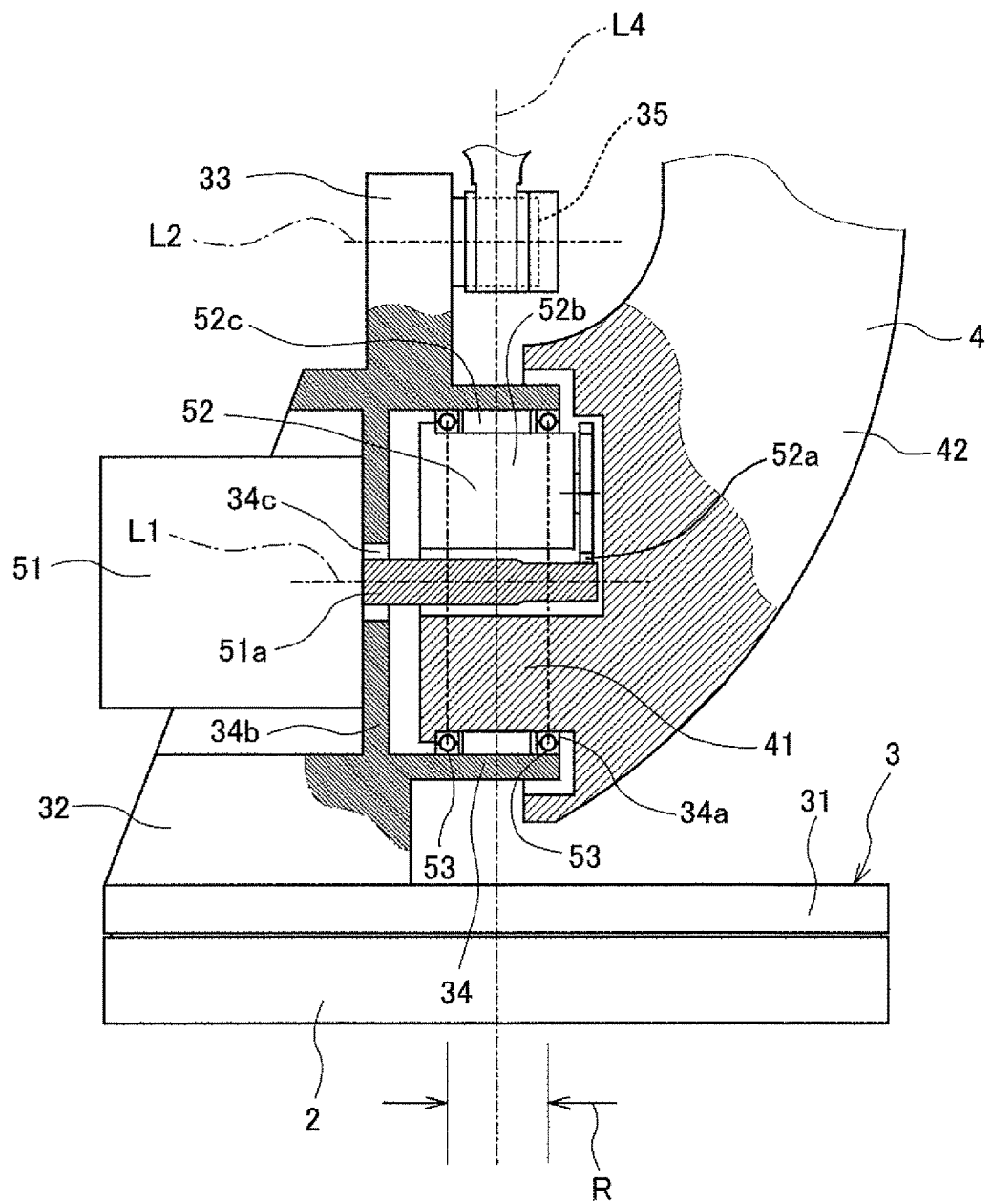
FIG. 2 is a rear view showing the exemplary configuration of a joint section of the robot of FIG. 1, which is partly cut away.
Figure 3:
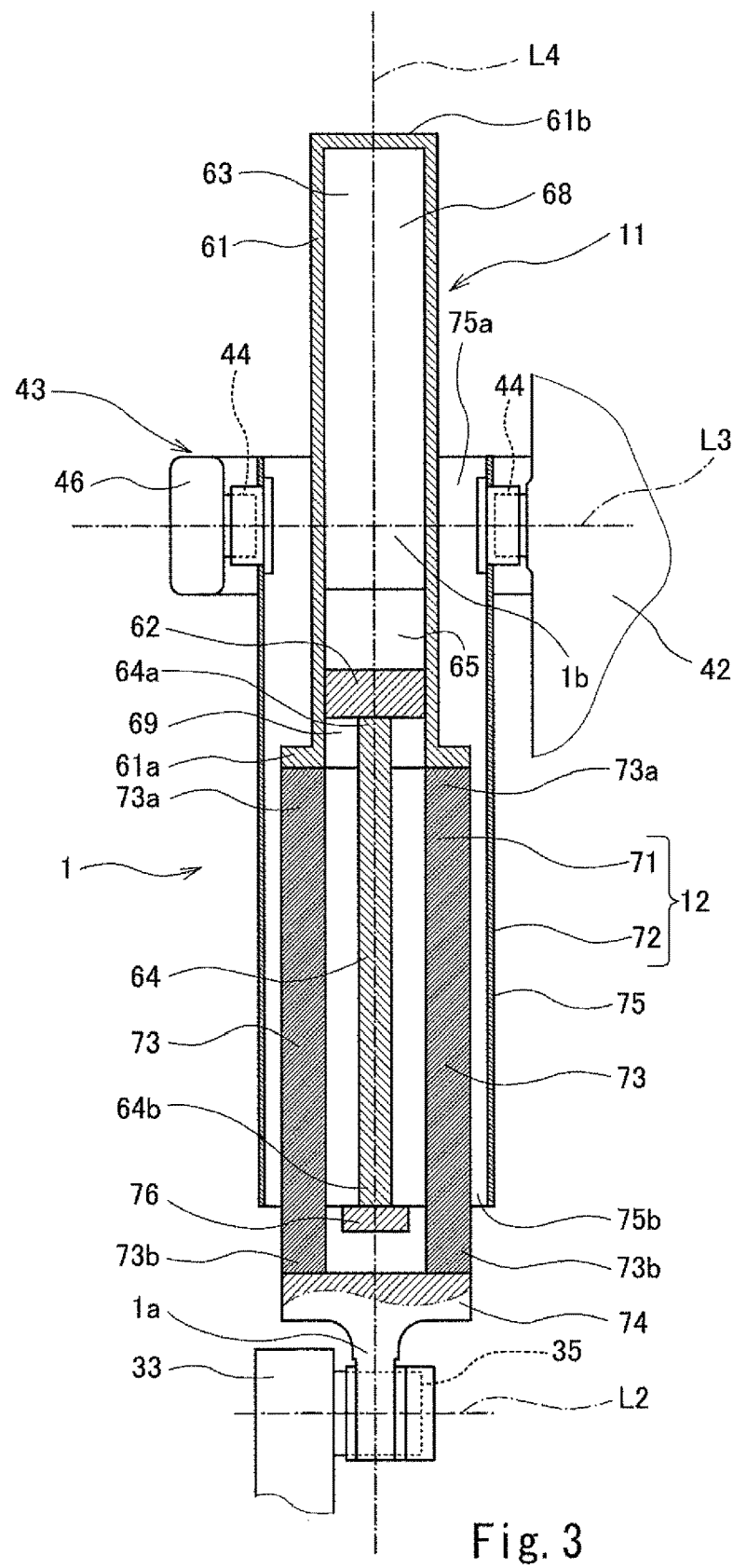
FIG. 3 is a rear view showing the exemplary configuration of the balancer device of the robot of FIG. 1, which is partly cut away.
Figure 4:
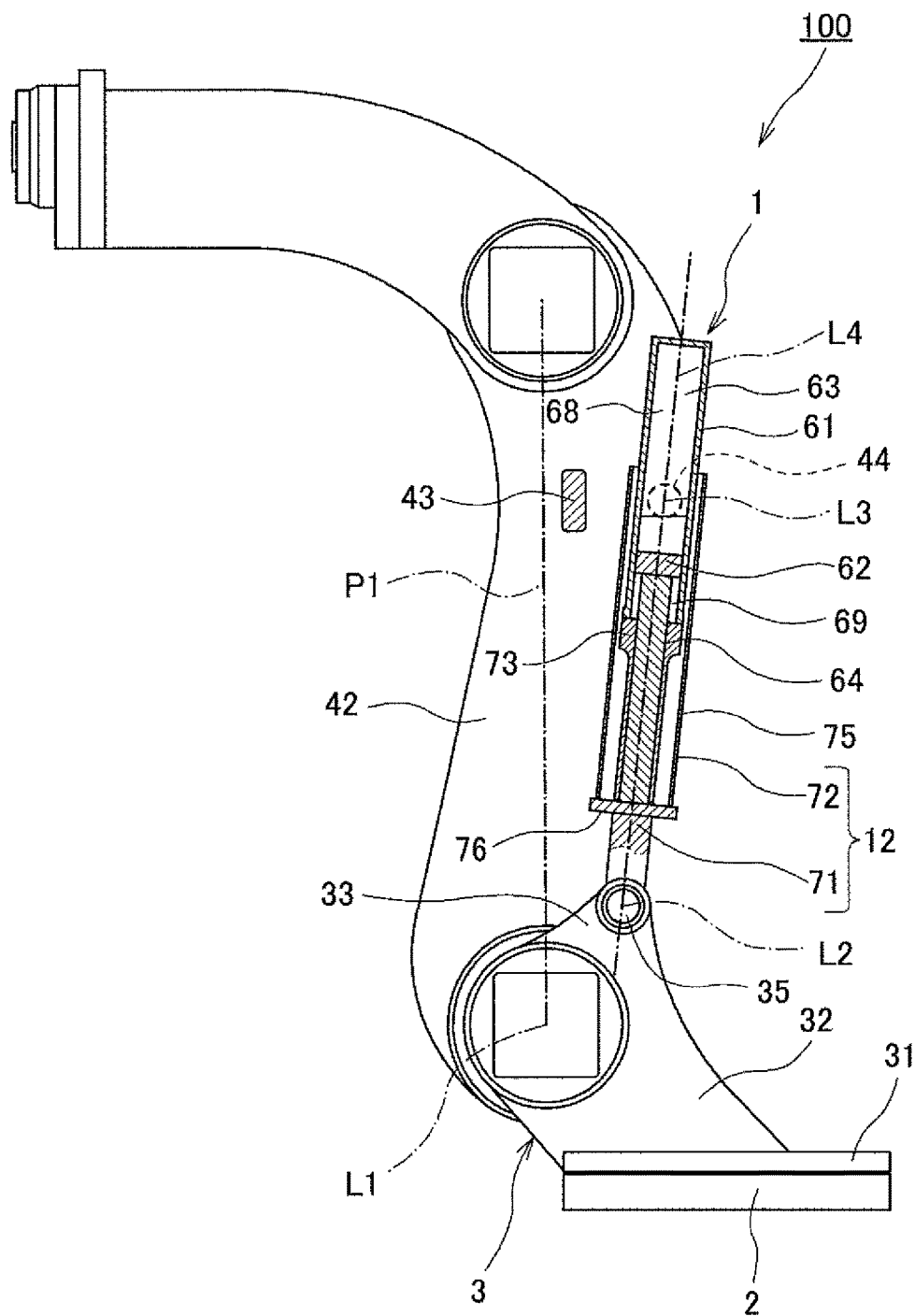
FIG. 4 is a side view showing the exemplary configuration of the joint section of the robot of FIG. 1, which is partly cut away.

FIG. 1 is a rear view showing the exemplary configuration of a robot 100 including a balancer (balancer device) 1 according to Embodiment 1 of the present invention, which is partly cut away. FIG. 2 is a rear view showing the exemplary configuration of a first joint section 5 (described later) of the robot 100, which is partly cut away. FIG. 3 is a rear view showing the exemplary configuration of the balancer 1 of the robot 100, which is partly cut away.

As shown in FIGS. 1 and 2, the robot 100 is a multi joint type robot, and includes the balancer 1, a base body 2, a rotary section 3, a first arm (robot arm) 4, and a first joint section 5. However, the robot 100 is not limited to the multi-joint type robot.

[Overall Configuration of Robot]

As shown in FIGS. 1 and 2, the base body 2 includes is fixed on, for example, a placement surface, and supports the upper structure of the base body 2.

The rotary section 3 is coupled to the base body 2 in such a manner that the rotary section 3 is rotatable around a rotational axis (not shown) extending vertically. The rotary section 3 includes a rotary plate 31 extending in parallel with the base body 2, an arm support section 32 provided above the rotary plate 31 and fixed on the rotary plate 31, and a balancer coupling section 33.

The rotary plate 31 is coupled to the base body 2 in such a manner that the rotary plate 31 is rotatable around the rotational axis. The rotary plate 31 is driven to be rotated around the rotational axis by a drive section (not shown).

The arm support section 32 includes a cylindrical portion 34 having a cylindrical shape extending horizontally. A first end portion of the cylindrical portion 34 opens to form an opening 34a. A second end portion of the cylindrical portion 34 is closed to form a bottom wall 34b. The center portion of the bottom wall 34b, namely, a portion through which the axis of the cylindrical portion 34 extends, is formed with a through-hole 34c. The through-hole 34c is a hole into which an output shaft 51a of a first arm drive section 51 which will be described later is inserted. The axis of the cylindrical portion 34 constitutes a first axis L1.

The balancer coupling section 33 protrudes upward from the upper portion of the arm support section 32. This structure makes it possible to prevent interference between the balancer 1 and the arm support section 32. The balancer coupling section 33 includes a shaft (first fastening section) 35 extending in parallel with the first axis L1. The axis of the shaft 35 constitutes a second axis L2. A location at which the shaft 35 is provided in a direction in which the first axis L1 extends includes a location range R which will be described later.

The first arm 4 has an arm shape and includes a rotary shaft 41 extending horizontally at a base end portion of the first arm 4, a body section 42 extending from the rotary shaft 41 toward a tip end portion of the first arm 4, and a balancer coupling section 43.

The rotary shaft 41 has a substantially cylindrical shape with a bottom. The rotary shaft 41 is located inside the cylindrical portion 34 in such a manner that the axis of the rotary shaft 41 conforms to the axis of the cylindrical portion 34 of the arm support section 32, namely, the first axis L1.

The body section 42 is curved to extend in a direction perpendicular to the first axis L1 as the body section 42 extends from the rotary shaft 41 toward the tip end portion of the first arm 4.

As shown in FIG. 3, the balancer coupling section 43 includes a pair of shafts (second fastening section) 44, and a support section 46. The pair of shafts 44 are located on a third axis L3 extending in parallel with the first axis L1 and the second axis L2. The pair of shafts 44 are arranged in a direction in which the third axis L3 extends. A first shaft 44 of the pair of shafts 44 protrudes from the side surface of a portion of the body section 42 which is between the base end portion and the tip end portion of the body section 42. A second shaft 44 of the pair of shafts 44 is supported by the support section 46 and is located to be apart from the first shaft 44. The base end portion of the support section 46 is attached to the side surface of the body section 42 of the first arm 4, while the tip end portion of the support section 46 supports the second shaft 44. The support section 46 extends to surround the outer side of a second coupling member 72 (which will be described later) of the balancer 1, while preventing interference with the balancer 1. A region where the pair of shafts 44 are placed in the direction in which the first axis L1 extends includes the location range R which will be described later.

As shown in FIG. 2, the first joint section 5 includes the first arm drive section 51, a reduction gear mechanism 52, and bearing members 53.

The first arm drive section 51 is, for example, a servo motor, and includes the output shaft 51a which outputs a driving force. A casing of the first arm drive section 51 is fixed on the bottom wall 34b of the cylindrical portion 34 in such a manner that the axis of the output shaft 51a is coaxial with the first axis L1. The output shaft 51a is inserted into the through-hole 34c of the cylindrical portion 34. The output shaft 51a is located inside the rotary shaft 41 through the opening 41a of the rotary shaft 41.

The reduction gear mechanism 52 is located inside the rotary shaft 41. The reduction gear mechanism 52 is a mechanism which transmits the driving force of the first arm drive section 51 to the first arm 4, and is, for example, an epicyclic gear mechanism. Specifically, the reduction gear mechanism 52 includes, for example, a sun gear 52a fixed to the tip end portion of the output shaft 51a, an epicyclic gear unit 52b including a plurality of epicyclic gears which are arranged at equal intervals around the first axis L1 and are in mesh with the sun gear 52a, and an inner gear 52c which is provided on the inner peripheral surface of the cylindrical portion 34 of the arm support section 32 and is in mesh with the epicyclic gear unit 52b. The reduction gear mechanism 52 is configured by a known reduction gear mechanism of an industrial robot, and therefore, further description will not be given.

The bearing members 53 are placed between the inner peripheral surface of the cylindrical portion 34 of the rotary section 3 and the outer peripheral surface of the rotary shaft 41 of the first arm 4 in such a manner that the center axes of the bearing members 53 conform to the first axis L1. In this configuration, the first arm 4 is rotatable around the first axis L1 with respect to the arm support section 32 of the rotary section 3. In other words, the arm support section 32 of the rotary section 3 supports the rotary shaft 41 of the first arm 4 in such a manner that the rotary shaft 41 is rotatable. In the present embodiment, two bearing members 53 are provided, and are arranged in the direction in which the first axis L1 extends. A region from a location at which a first bearing member 53 of the two bearing members 53 is provided to a location at which a second bearing member 53 of the two bearing members 53 is provided, constitutes the location range R. The number of the bearing members 53 provided in the location range R is not limited to this, and may be one, or three or more.

Figure 5:
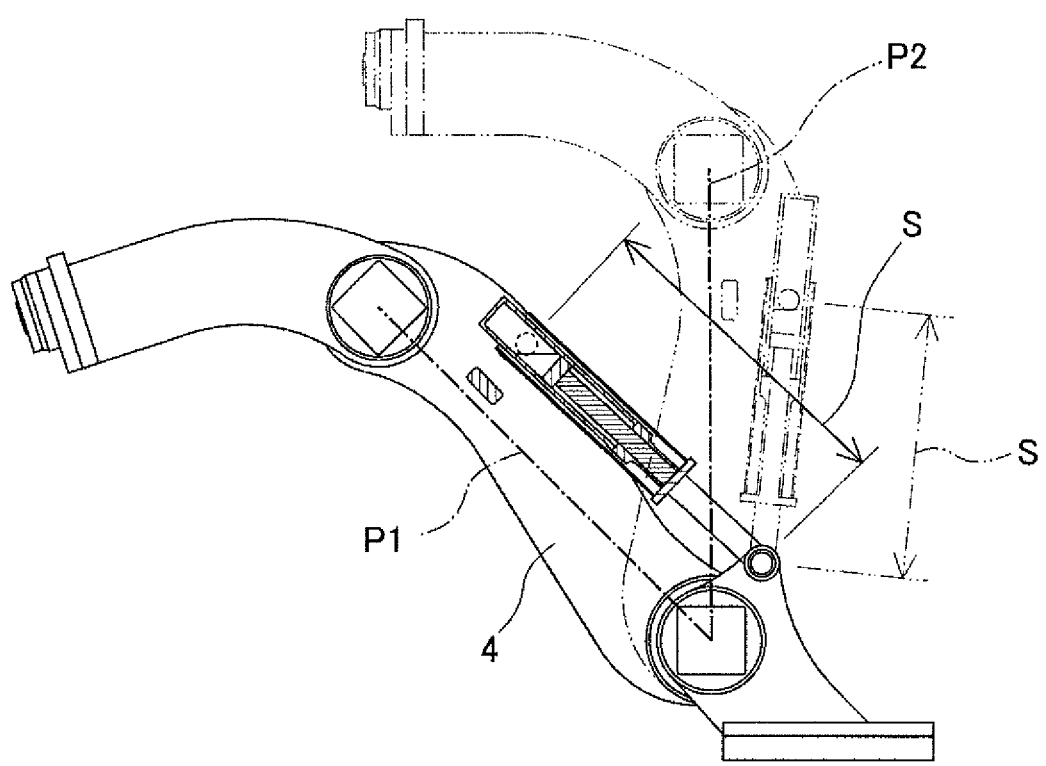
FIG. 5 is a side view showing the exemplary configuration of the joint section of the robot of FIG. 1, which is partly cut away.

As shown in FIG. 5, for example, the first arm 4 is rotatable within a range including a range between a first angular position P1 and a second angular position P2 which is greater than the first angular position P1 in inclination with respect to a vertical direction of FIG. 3. For example, the first angular position P1 is an angular position at which the first arm 4 is upright. At the first angular position P1 at which the first arm 4 is upright, torque (this will be hereinafter referred to as gravitational torque around the first axis L1) around the first axis L1 which is generated by a gravitational force applied to the first arm 4 is substantially zero. As the first arm 4 rotates from the first angular position P1 toward the second angular position P2, and the inclination of the first arm 4 increases, the gravitational torque around the first axis L1 increases.

In the present embodiment, as shown in FIG. 5, the shaft 35 of the rotary section 3 and the pair of shafts 44 of the first arm 4 are positioned so that a spacing S formed between the second axis L2 and the third axis L3 in the state in which the first arm 4 is at the second angular position P2 becomes greater than a spacing S formed between the second axis L2 and the third axis L3 in the state in which the first arm 4 is at the first angular position P1. In other words, the robot 100 is configured in such a manner that the spacing S between the second axis L2 and the third axis L3 gradually increases, as the first arm 4 rotates from the first angular position P1 toward the second angular position P2.

[Balancer]

As shown in FIGS. 1 and 3, the balancer 1 includes a gas spring mechanism (elastic structure unit) 11, and a conversion mechanism 12. The balancer 11 extends in a direction in which a fourth axis L4 extends, the fourth axis L4 connecting the second axis L2 to the third axis L3 and extending in the direction perpendicular to the second axis L2 and the third axis L3. The balancer 1 is mounted to the robot 100 in such a manner that the fourth axis L4 is located within the location range R, to be precise, a first end portion 1a which is one end portion of the balancer 1 and a second end portion 1b which is the other end portion of the balancer 1 are located within the location range R.

The gas spring mechanism 11 is a mechanism which uses a reactive force of a high-pressure gas filled therein, as a spring force. The gas spring mechanism 11 is smaller in size and is able to generate a greater spring force, compared to a coil spring. For this reason, by use of the gas spring mechanism 11, the size of the robot 100 can be reduced. Thereby, the output of the drive section of the robot 100 can be reduced, and hence electric power consumption in the robot 100 is not increased.

The gas spring mechanism 11 includes a cylinder 61, a piston 62, a working fluid 63, and a piston rod 64. In addition, in the present embodiment, the gas spring mechanism 11 includes seal oil 65.

The cylinder 61 is a bottomed cylindrical body extending in the direction in which the fourth axis L4 extends. The cylinder 61 is formed with an opening at a first end portion 61a thereof. A second end portion 61b of the cylinder 61 is closed, to form a bottom wall of the cylinder 61.

The piston 62 is a cylindrical block. The piston 62 is relatively slidable with respect to the inner wall surface of the cylinder 61. The piston 62 comparts the inner space of the cylinder 61 into a first space 68 and a second space 69 in the direction in which the fourth axis L4 extends. The first space 68 is a space formed to be closer to the second end portion 61b (closed end portion) of the cylinder 61 than the piston 62 is. The second space 69 is a space formed to be closer to the first end portion 61a (end portion formed with the opening) of the cylinder 61 than the piston 62 is. As will be described later in detail, the gas spring mechanism 11 is mounted to the robot 100 in such a manner that the first space 68 is located above the second space 69.

The working fluid 63 is a fluid provided in a space formed between the cylinder 61 and the piston 62, namely, the first space 68. The working fluid 63 is, for example, high-pressure nitrogen. As described above, since the second end portion 61b of the cylinder 61 is closed, the working fluid 63 does not leak from the second end portion 61b of the cylinder 61. This makes it possible to improve the durability of the gas spring mechanism 11.

The piston rod 64 is a rod-like member extending in the direction in which the fourth axis L4 extends. A first end portion 64a of the piston 64 is coupled to the piston 62. The piston rod 64 extends from the piston 62 to a region that is outside the cylinder 61 through the second space 69 and then the opening formed in the first end portion 61a of the cylinder 61. A second end portion 64b of the piston rod 64 is located outside the cylinder 61.

The gas spring mechanism 11 is configured to compress the working fluid 63 and thereby generate a reactive force in such a manner that the gas spring mechanism 11 moves the piston rod 64 in the direction in which the fourth axis L4 extends, to push the piston rod 64 into the cylinder 61 and thereby contract (reduce the length of) the gas spring mechanism 11.

The seal oil 65 is oil which prevents a leakage of the working fluid 63 from the first space 68, and is filled into a portion of the first space 68 of the cylinder 61. As described above, the gas spring mechanism 11 is placed in such a manner that the first space 68 is located above the second space 69. For this reason, the seal oil 65 is reserved on the piston 62, while the working fluid 63 which is a gas with a specific weight which is smaller than that of the seal oil 65 is present above the seal oil 65. Therefore, the seal oil 65 is present in a region between the working fluid 63 which is the gas and a portion of the cylinder 61 and a portion of the piston 62, which contact each other, to prevent a leakage of the working fluid 63 from the first space 68. As a result, the durability of the gas spring mechanism 11 can be improved.

The conversion mechanism 12 is a mechanism which contracts (reduces the length of) the gas spring mechanism 11, as the spacing S formed between the second axis L2 and the third axis L3 expands.

In the present embodiment, the conversion mechanism 12 includes a first coupling member 71 and a second coupling member 72.

The first coupling member 71 couples the first end portion 61a of the cylinder 61 to the shaft 35 of the rotary section 3. More specifically, the first coupling member 71 couples to the cylinder 61, the shaft 35 of the rotary section 3, which is located in a direction from the second end portion 61b (closed end portion) of the cylinder 61 toward the first end portion 61a (end portion formed with the opening) of the cylinder 61. Alternatively, the first coupling member 71 may be mounted to a location different from the first end portion 61a of the cylinder 61.

The first coupling member 71 includes a pair of plate sections 73 extending in parallel with each other, and a coupling section 74. First end portions 73a of the plate sections 73 are coupled to the first end portion 61a of the cylinder 61 and extend in the direction in which the fourth axis L4 extends. A first plate section 73 of the pair of plate sections 73 is attached to the first end portion 61a on a first side in the direction in which the second axis L2 and the third axis L3 extend. A second plate section 73 of the pair of plate sections 73 is attached to the first end portion 61a on a second side in the direction in which the second axis L2 and the third axis L3 extend. The coupling section 74 couples the second end portions 73b of the pair of plate sections 73 to each other, and also couples the second end portions 73b of the pair of plate sections 73 to the shaft 35.

The coupling section 74 is mounted to the shaft 35 via a bearing member in such a manner that the coupling section 74 is rotatable around the second axis L2. A portion of the coupling section 74, which is mounted to the shaft 35, constitutes the first end portion 1a which is one end portion of the balancer 1. As described above, the region at which the shaft 35 is provided in the direction in which the first axis L1 extends, includes the location range R. Therefore, the first end portion 1a is located on the location range R.

The second coupling member 72 couples the second end portion 64b of the piston rod 64 to the shafts 44 of the first arm 4. More specifically, the second coupling member 72 couples to the piston rod 64, the shafts 44 which are located in the direction from the first end portion 61a (end portion formed with the opening) of the cylinder 61 toward the second end portion 61b (closed end portion) of the cylinder 61. Therefore, the gas spring mechanism 11 is mounted to the robot 100 by the conversion mechanism 12 in such a manner that the first space 68 is located above the second space 69.

The second coupling member 72 includes a tubular section 75 and a coupling section 76.

The tubular section 75 is a tubular body extending in the direction in which the fourth axis L4 extends. The tubular section 75 is placed to surround the outer periphery of the gas spring mechanism 11 and the outer periphery of the first coupling member 71. The second coupling member 72 is configured such that a first end portion 75a of the tubular section 75 is mounted to the pair of shafts 44 via bearing members in the location range R. In this configuration, the tubular section 75 is coupled to the shafts 44 in such a manner that the tubular section 75 is rotatable around the third axis L3. Portions of the tubular section 75, which are mounted to the shafts 44, constitute the second end portion 1b which is the other end portion of the balancer 1. As described above, the region in which the pair of shafts 44 are provided in the direction in which the first axis L1 extends includes the location range R. Therefore, the second end portion 1b is located on the position range R.

The pair of shafts 44 are positioned in such a manner that the third axis L3 extends through the cylinder 61. The cylinder 61 protrudes in the direction in which the fourth axis L4 extends, from a location at which the second coupling member 72 and the first arm 4 are coupled to each other. This makes it possible to increase the stroke of the gas spring mechanism 11. As a result, the operation range of the first arm 4 can be expanded.

The coupling section 76 is mounted to the second end portion 64b of the piston rod 64 and is located between the pair of plate sections 73 of the first coupling member 71. The coupling section 76 is provided to connect the edge portions of the second end portion 75b of the tubular section 75. The both end portions of the coupling section 76 are coupled to the edge of the tubular section 75 at a location that is closer to the second end portion 75b. The coupling section 76 is located between the pair of plate sections 73 extending in the direction in which the fourth axis L4 extends. Therefore, when the piston rod 64 is moved in the direction in which the fourth axis L4 extends, the coupling section 76 does not interfere with the pair of plate sections 73.

In the conversion mechanism 12 configured as described above, when the first arm 4 rotates from the first angular position P1 toward the second angular position P2, and thereby the spacing S formed between the second axis L2 and the third axis L3 expands, the first end portions 73a of the pair of plate sections 73 of the first coupling member 71 and the second end portion 75b of the tubular section 75 of the second coupling member 72 become close to each other. Thereby, the first end portion 61a of the cylinder 61 which is mounted to the first end portions 73a of the pair of plate sections 73 of the first coupling member 71 and the second end portion 64b of the piston rod 64 move so as to become close to each other, so that the piston rod 64 and the piston 62 are pushed into the cylinder 61. Therefore, the working fluid 63 in the space formed between the cylinder 61 and the piston 62 is compressed, and hence the reactive force is generated.

[Exemplary Operation]

Next, the exemplary operation of the robot 100 including the balancer 1 will be described.

As the first arm 4 rotates from the first angular position P1 toward the second angular position P2, and the inclination of the first arm 4 increases, the gravitational torque around the first axis L1 increases. When the spacing S formed between the second axis L2 and the third axis L3 expands, according to the rotation of the first arm 4 from the first angular position P1 toward the second angular position P2, the conversion mechanism 12 contracts (reduces the length of) the gas spring mechanism 11. Thereby, the working fluid 63 is compressed, and hence the gas spring mechanism 11 generates the reactive force applied in a direction to push back the piston 62, namely, a direction to extend (increase the length of) the gas spring mechanism 11, in the direction in which the fourth axis L4 extends. The conversion mechanism 12 converts the reactive force applied in the direction to extend the gas spring mechanism 11 into a force applied in a direction to reduce the length of the spacing S formed between the second axis L2 and the third axis L3. As a result, torque (balance torque) around the first axis L1 which is applied in a direction opposite to the direction of the gravitational force around the first axis L1 is generated. This balance torque cancels a part or all of the gravitational torque. This makes it possible to reduce the load of the first arm drive section 51, and prevent an increase in the electric power consumption in the robot 100.

As described above, the gas spring mechanism 11 is mounted to the robot 100 in such a manner that the fourth axis L4 is included in the location range R in which the bearing members 53 are located in the direction in which the first axis L1 extends, to be precise, the first end portion 1a which is one end portion of the balancer 1 and the second end portion 1b which is the other end portion of the balancer 1, are located in the location range R. In this structure, the bending moment acting on the bearing members 53 can be reduced, and hence the bearing members 53 with a small permissible bending moment can be used. Therefore, the weight of the robot 100 can be reduced, and a motor which generates a low output can be used as the drive section of the robot 100, in particular, the drive section which rotates the rotary section 3. As a result, the electric power consumption in the robot 100 can be reduced.

Embodiment 2

Figure 6:
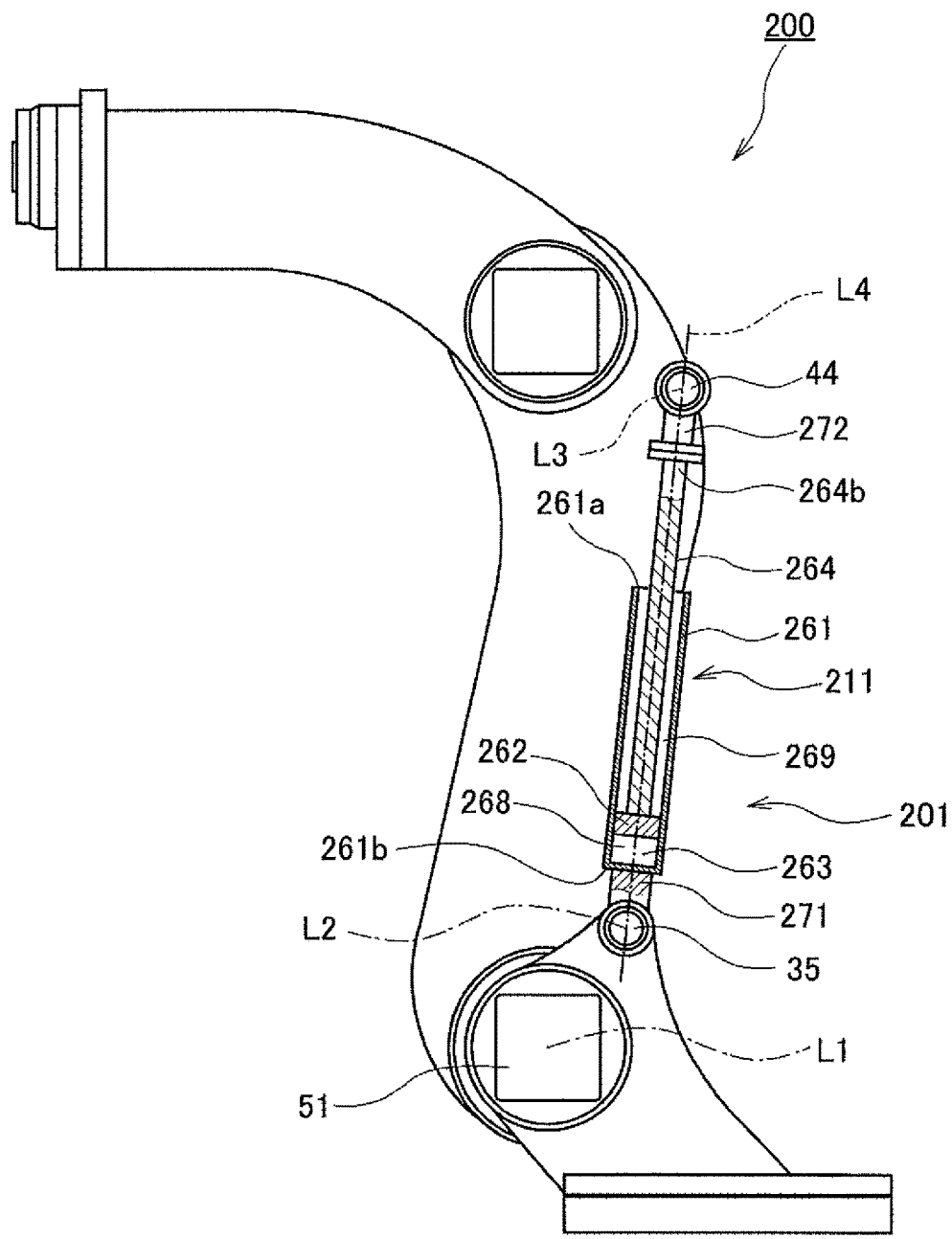
FIG. 6 is a side view showing the exemplary configuration of a robot including a balancer device according to Embodiment 2 of the present invention, which is partly cut away.

FIG. 6 is a side view showing the exemplary configuration of a robot 200 including a balancer 201 according to the embodiment of the present invention.

In the above-described Embodiment 1, the balancer 1 includes the gas spring mechanism 11 which is contracted to compress the working fluid 63 and thereby generate the reaction force applied in the direction to extend (increase the length of) the gas spring mechanism 11, and the conversion mechanism 12 which converts the reaction force applied in the direction to extend the gas spring mechanism 11 into the force applied in the direction to reduce the length of the spacing S formed between the second axis L2 and the third axis L3. In contrast, in the present embodiment, as shown in FIG. 6, the balancer 201 includes a gas spring mechanism 211 which is extended to expand a working fluid 263 and thereby generate a reactive force applied in a direction to contract the gas spring mechanism 211, and coupling members 271, 272 for coupling the gas spring mechanism 211 to the robot 200.

The gas spring mechanism 211 is mounted to the robot 200 in such a manner that a first space 268 in which the working fluid 263 is provided, is located below a second space 269. The working fluid 263 is, for example, a normal-pressure gas. A piston rod 264 is moved in the direction in which the fourth axis L4 extends, and drawn out of a cylinder 261 to extend the gas spring mechanism 11. Thereby, the working fluid 263 is expanded, and hence the force applied in the direction to contract the gas spring mechanism 11 is generated.

The coupling member 271 couples a second end portion 261b of the cylinder 261 to the shaft 35 of the rotary section 3. The coupling member 271 is coupled to the shaft 35 via a bearing member in such a manner that the coupling member 271 is rotatable around the second axis L2.

The coupling member 272 couples a second end portion 264b of the piston rod 264 to the shafts 44 of the first arm 4. The coupling member 272 is coupled to the shafts 44 via bearing members in such a manner that the coupling member 272 is rotatable around the third axis L3. In Embodiment 1, the shafts 44 are positioned so that the third axis L3 extends through the cylinder 61. In contrast, in the present embodiment, the shafts 44 are positioned so that the third axis L3 extends through the tip end portion of the first arm 4.

Except the above, the configuration of Embodiment 2 is the same as that of Embodiment 1.

[Exemplary Operation]

Next, the exemplary operation of the robot 200 including the balancer 201 will be described.

As the first arm 4 rotates from the first angular position P1 toward the second angular position P2, and the inclination of the first awl 4 increases, the gravitational torque around the first axis L1 increases. When the spacing S formed between the second axis L2 and the third axis L3 expands, according to the rotation of the first arm 4 from the first angular position P1 toward the second angular position P2, the gas spring mechanism 211 is extended. Thereby, the working fluid 263 is expanded, and the gas spring mechanism 211 generates the reactive force applied in a direction to draw back the piston 62, namely, a direction to contract the gas spring mechanism 211. The reactive force applied in the direction to contract the gas spring mechanism 211 works as the force applied in the direction to reduce the length of the spacing S formed between the second axis L2 and the third axis L3. As a result, torque (balance torque) around the first axis L1 which is applied in a direction opposite to the direction of the gravitational force around the first axis L1 is generated. This balance torque cancels a part or all of the gravitational torque.

Embodiment 3

Figure 7:
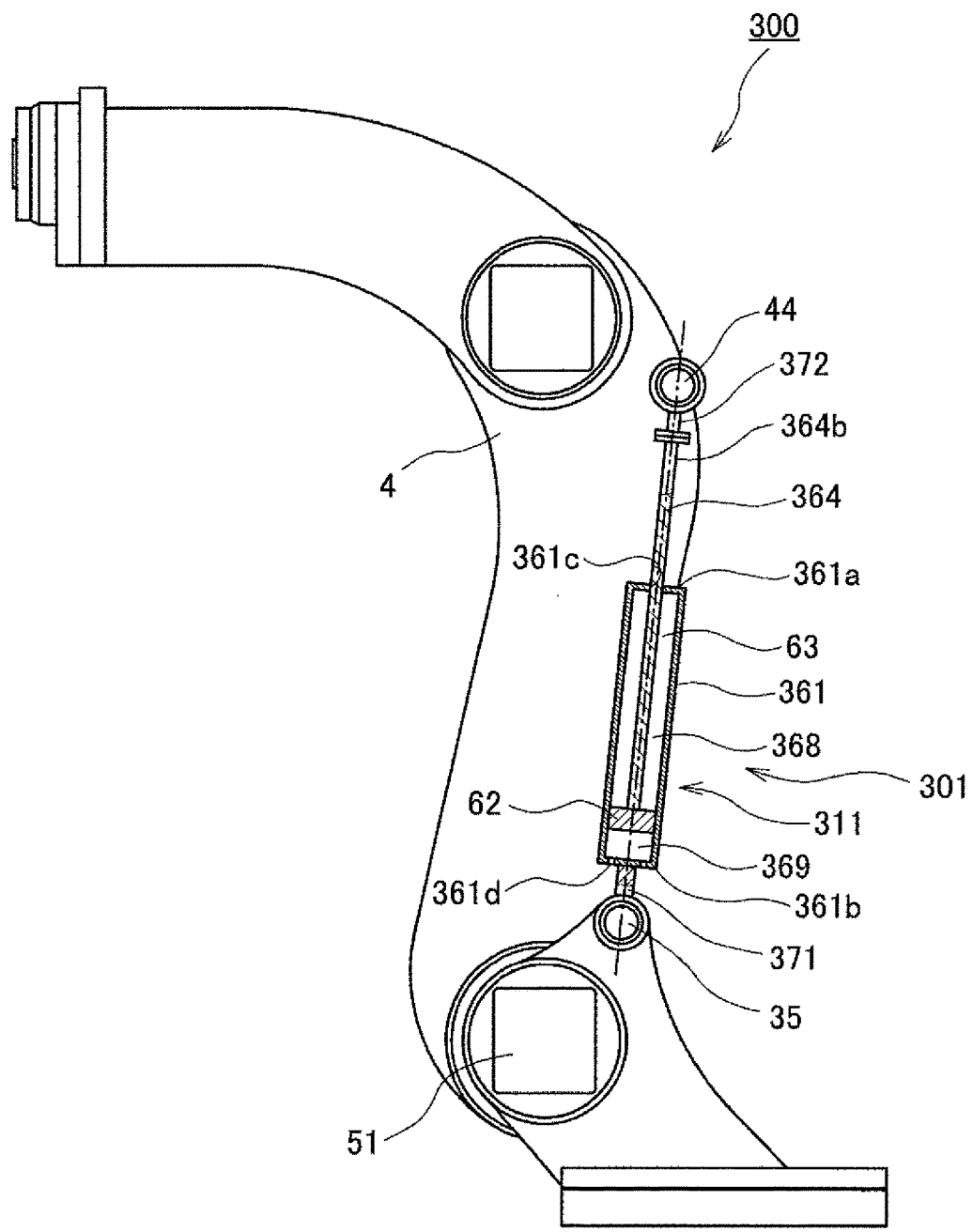
FIG. 7 is a side view showing the exemplary configuration of a robot including a balancer device according to Embodiment 3 of the present invention, which is partly cut away.

FIG. 7 is a side view showing the exemplary configuration of a robot 300 including a balancer 301 according to Embodiment 3 of the present invention.

In the above-described Embodiment 1, the balancer 1 includes the gas spring mechanism 11 which is contracted to compress the working fluid 63 and thereby generate the reaction force applied in the direction to extend the gas spring mechanism 11, and the conversion mechanism 12 which converts the reaction force applied in the direction to extend the gas spring mechanism 11 into the force applied in the direction to reduce the length of the spacing S formed between the second axis L2 and the third axis L3. In contrast, in the present embodiment, as shown in FIG. 7, the balancer 301 includes a gas spring mechanism 311 which is extended to compress the working fluid 63 and thereby generate a reactive force applied in a direction to contract the gas spring mechanism 311, and coupling members 371, 372 for coupling the gas spring mechanism 311 to the robot 300.

A cylinder 361 of the gas spring mechanism 311 has both end portions closed. A first end portion 361a of the cylinder 361 is formed with an insertion hole 361c into which a piston rod 364 is inserted. A second end portion 361b of the cylinder 361 is formed with a through-hole 361d. In this structure, an air pressure in a second space 369 of the cylinder 361 is equal to an atmospheric pressure. The piston rod 364 extends from the piston 62 to a location that is outside the cylinder 361 through a first space 368 and the insertion hole 361c of the cylinder 361. A second end portion 364b of the piston rod 364 is located outside the cylinder 361. The piston rod 364 is moved in the direction in which the fourth axis L4 extends, and drawn out of the cylinder 361 to extend the gas spring mechanism 311. Thereby, the working fluid 63 is compressed and hence the force applied in the direction to contract the gas spring mechanism 311 is generated.

The coupling member 371 couples the second end portion 361b of the cylinder 361 to the shaft 35 of the rotary section 3. The coupling member 371 is coupled to the shaft 35 via a bearing member in such a manner that the coupling member 371 is rotatable around the second axis L2.

The coupling member 372 also couples the second end portion 364b of the piston rod 364 to the shafts 44 of the first arm 4. The coupling member 372 is coupled to the shafts 44 via bearing members in such a manner that the coupling member 372 is rotatable around the third axis L3.

The gas spring mechanism 311 is mounted to the robot 300 in such a manner that the first space 368 in which the working fluid 63 is provided, is located above the second space 369.

In Embodiment 1, the shafts 44 are positioned so that the third axis L3 extends through the cylinder 61. In contrast, in the present embodiment, the shafts 44 are positioned so that the third axis L3 extends through the tip end portion of the first arm 4.

Except the above, the configuration of Embodiment 3 is the same as that of Embodiment 1.

[Exemplary Operation]

Next, the exemplary operation of the robot 300 including the balancer 301 will be described.

As the first arm 4 rotates from the first angular position P1 toward the second angular position P2, and the inclination of the first arm 4 increases, the gravitational torque around the first axis L1 increases. When the spacing S formed between the second axis L2 and the third axis L3 expands, according to the rotation of the first arm 4 from the first angular position P1 toward the second angular position P2, the gas spring mechanism 311 is extended. Thereby, the working fluid 63 is compressed, and the gas spring mechanism 311 generates a reactive force applied in a direction to push back the piston 62, namely, a direction to contract (reduce the length of) the gas spring mechanism 311, in the direction in which the fourth axis L4 extends. The reactive force applied in the direction to contract the gas spring mechanism 311 works as a force applied in a direction to reduce the length of the spacing formed between the second axis L2 and the third axis L3. As a result, torque (balance torque) around the first axis L1 which is applied in a direction opposite to the direction of the gravitational force around the first axis L1 is generated. This balance torque cancels a part or all of the gravitational torque.

Embodiment 4

Figure 8:
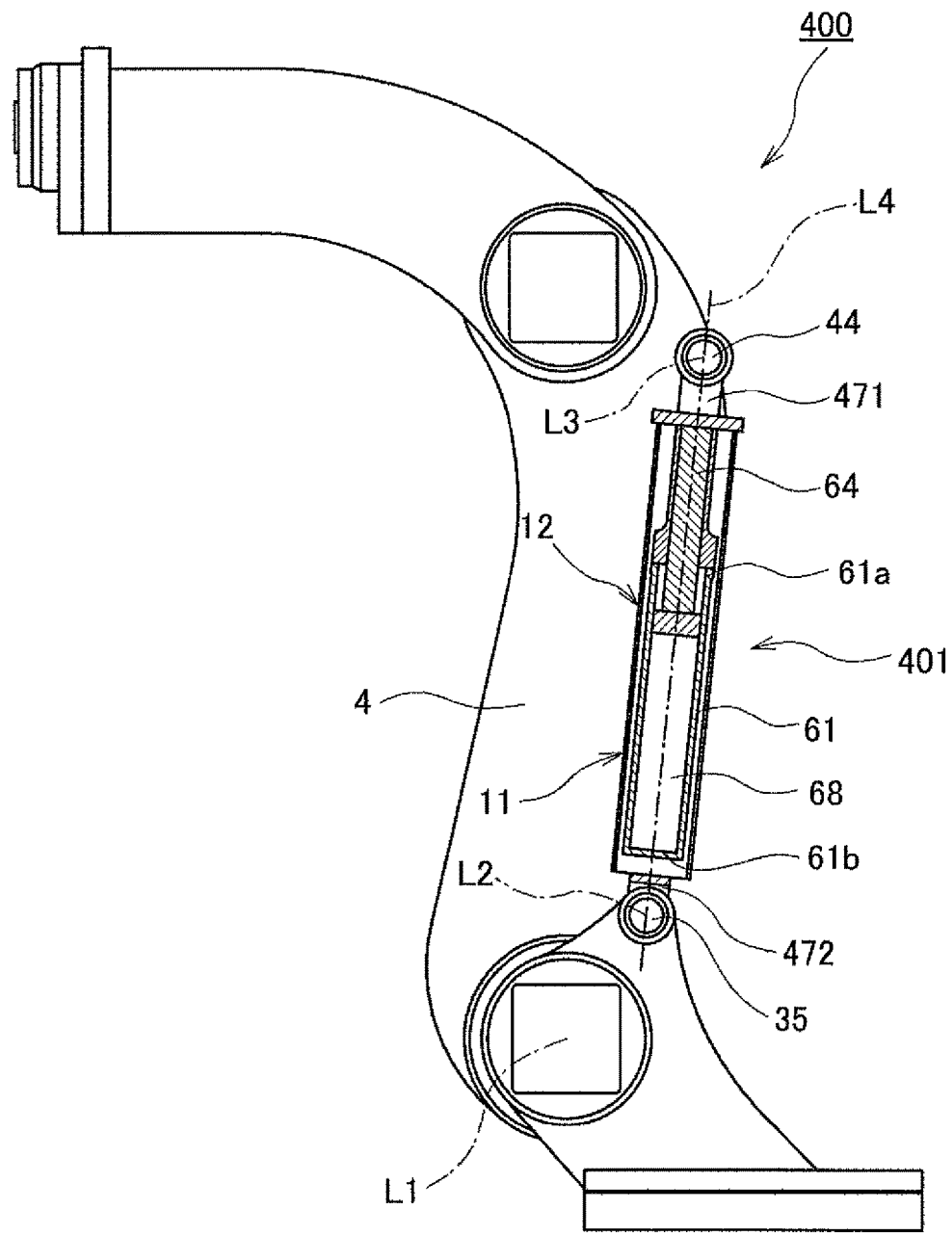
FIG. 8 is a side view showing the exemplary configuration of a robot including a balancer device according to Embodiment 4 of the present invention, which is partly cut away.

FIG. 8 is a side view showing the exemplary configuration of a robot 400 including a balancer 401 according to Embodiment 4 of the present invention.

In the above-described Embodiment 1, the first coupling member 71 couples the first end portion 61a of the cylinder 61 to the shaft 35 of the rotary section 3, while the second coupling member 72 couples the second end portion 64b of the piston rod 64 to the shafts 44 of the first arm 4. In contrast, as shown in FIG. 8, in the present embodiment, the gas spring mechanism 11 is mounted to the robot 100 in such a manner that the first space 68 is located below the second space 69. A first coupling member 471 couples to the cylinder 61, the shafts 44 of the first arm 4, which are located in a direction from the second end portion 61b (closed end portion) of the cylinder 61 toward the first end portion 61a (end portion formed with the opening) of the cylinder 61. A second coupling member 472 couples to the piston rod 64 the shaft 35 located in a direction from the first end portion 61a (end portion formed with the opening) of the cylinder 61 toward the second end portion 61b (closed end portion) of the cylinder 61.

In Embodiment 1, the shafts 44 are positioned so that the third axis L3 extends through the cylinder 61, while in the present embodiment, the shafts 44 are positioned so that the third axis L3 extends through the tip end portion of the first arm 4. Except the above, the configuration of Embodiment 4 is the same as that of Embodiment 1.

Embodiment 5

Figure 9:
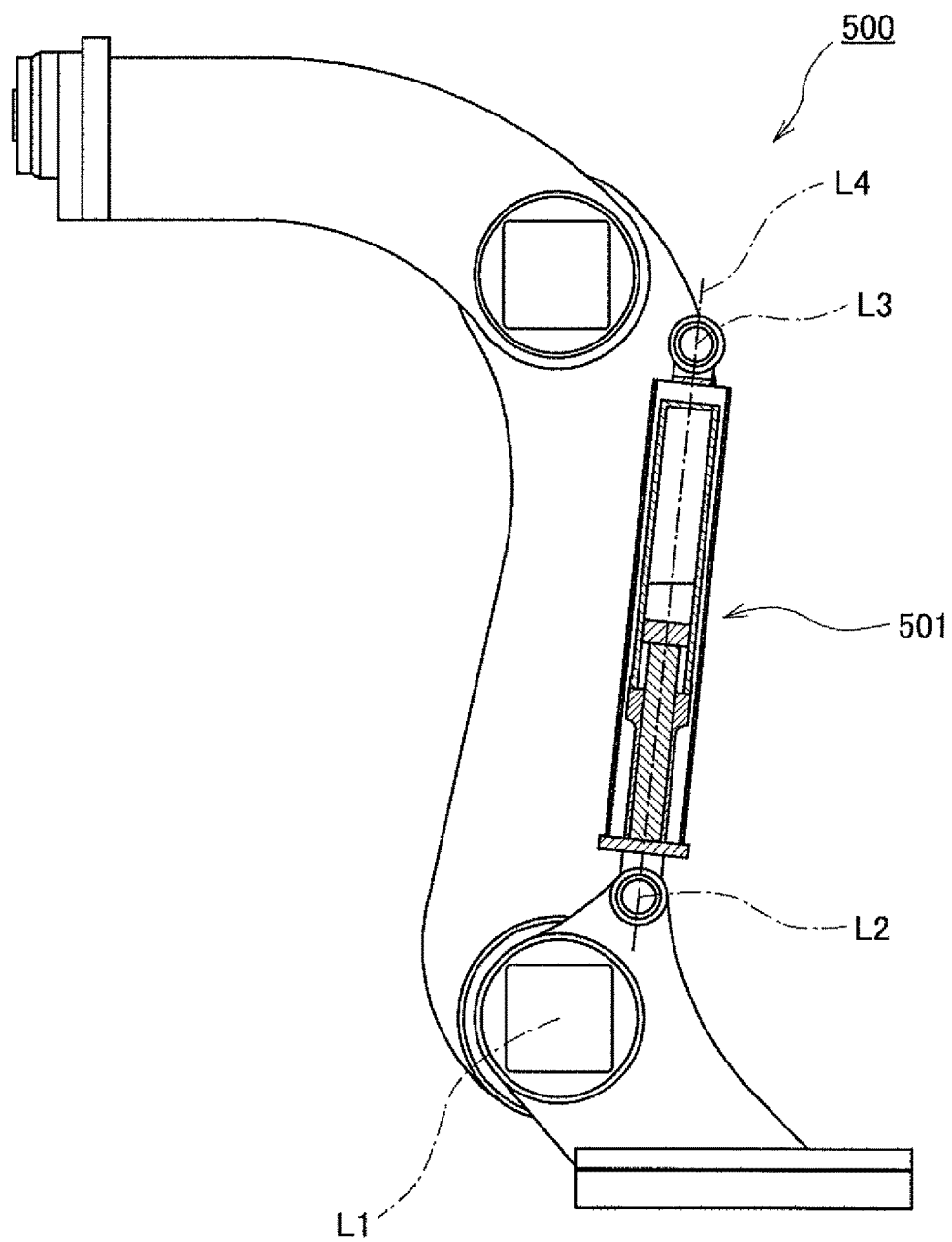
FIG. 9 is a side view showing the exemplary configuration of a robot including a balancer device according to Embodiment 5 of the present invention, which is partly cut away.

FIG. 9 is a side view showing the exemplary configuration of a robot 500 including a balancer 501 according to Embodiment 5 of the present invention.

In the above-described Embodiment 1, the shafts 44 are positioned so that the third axis L3 extends through the cylinder 61, while in the present embodiment, the shafts 44 are positioned so that the third axis L3 extends through the tip end portion of the first arm 4. Except the above, the configuration of Embodiment 5 is the same as that of Embodiment 1.

Modified Example

Although in the above-described embodiments, the gas spring mechanism is used, the present invention is not limited to this. Instead of this, a coil spring may be used.

Numerous improvements and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is applicable to industrial robots.

REFERENCE SIGNS LIST

L1 first axis
L2 second axis
L3 third axis
L4 fourth axis
P1 first angular position
P2 second angular position
1 balancer
1a first end portion
1b second end portion
2 base body
3 rotary section
4 first arm
5 first joint section
11 gas spring mechanism
12 conversion mechanism
31 rotary plate
32 arm support section
33 balancer coupling section
34 cylindrical portion
35 shaft
41 rotary shaft
42 body section
43 balancer coupling section
44 shaft
46 support section
51 first arm drive section
52 reduction gear mechanism
53 bearing member
61 cylinder
61a first end portion
61b second end portion
62 piston
63 working fluid
64 piston rod
65 seal oil
68 first space
69 second space
71 first coupling member
72 second coupling member
73 plate section
74 coupling section
75 tubular section
76 coupling section
100 robot

The invention claimed is:

1. A balancer device which is provided at a robot including a robot arm, and an arm support section to which a base end portion of the robot arm is mounted via a bearing member having a first axis extending horizontally as a center axis in such a manner that the robot arm is rotatable, the balancer device including a gas spring mechanism which causes the robot arm to generate balance torque around the first axis in a direction opposite to torque around the first axis which is generated by a gravitational force applied to the robot arm, between a first angular position and a second angular position which is greater in inclination with respect to a vertical direction than the first angular position is, and a conversion mechanism, wherein a first end portion of the balancer device is coupled to a first fastening section which is independent of the robot arm in such a manner that the balancer device is rotatable around a second axis extending horizontally, wherein a second end portion of the balancer device is coupled to a second fastening section provided at the robot arm in such a manner that the balancer device is rotatable around a third axis extending horizontally, wherein a spacing formed between the second axis and the third axis in a state in which the robot arm is at the second angular position is greater than a spacing formed between the second axis and the third axis in a state in which the robot arm is at the first angular position, wherein the gas spring mechanism includes:
a cylinder having an opening at a first end portion thereof and extending from the first end portion toward the second fastening section, a second end portion of the cylinder being closed,
a piston that is slidable with respect to an inner wall surface of the cylinder, the piston comparting an inner space of the cylinder into a first space closer to the second end portion of the cylinder and a second space closer to the first end portion of the cylinder,
a working fluid provided in the first space, and
a piston rod having a first end portion coupled to the piston, the piston rod extending from a spatial position at which the piston rod is coupled to the piston to a location that is outside the cylinder, through the opening of the cylinder, and the gas spring mechanism is contracted to compress the working fluid, wherein the conversion mechanism includes:
a first coupling member that couples the cylinder to the first fastening section; and
a second coupling member that couples a second end portion of the piston rod to the second fastening section, wherein the conversion mechanism contracts the gas spring mechanism according to a rotation of the robot arm from the first angular position toward the second angular position, and wherein the balance torque is generated by a reactive force generated by compression of the working fluid.

2. The balancer device according to claim 1, wherein the gas spring mechanism is extended to expand a working fluid, and wherein the balance torque is generated by a reactive force generated by expansion of the working fluid.

3. The balancer device according to claim 1, wherein the gas spring mechanism is extended to compress a working fluid, and wherein the balance torque is generated by a reactive force generated by compression of the working fluid.

4. The balancer device according to claim 1, wherein the gas spring mechanism further includes seal oil provided in the first space, and wherein the first space is located above the second space.

5. The balancer device according to claim 4, wherein the third axis extends through the cylinder.

* * * * *